US012334621B2

(12) United States Patent
Gelman et al.

(10) Patent No.: US 12,334,621 B2
(45) Date of Patent: Jun. 17, 2025

(54) ANTENNA SEALING PLUG AND ANTENNA DEVICE FOR A VEHICLE

(71) Applicant: Hirschmann Car Communication GmbH, Neckartenzlingen (DE)

(72) Inventors: Alexander Gelman, Neckartenzlingen (DE); Markus Pfletschinger, Neckartenzlingen (DE); Sofiane Ahmed, Neckartenzlingen (DE); Bernd Schwarz, Neckartenzlingen (DE)

(73) Assignee: Hirschmann Car Communication GmbH, Neckartenzlingen (DE)

( * ) Notice: Subject to any disclaimer, the term of this patent is extended or adjusted under 35 U.S.C. 154(b) by 228 days.

(21) Appl. No.: 18/188,522

(22) Filed: Mar. 23, 2023

(65) Prior Publication Data

US 2023/0307816 A1 Sep. 28, 2023

(30) Foreign Application Priority Data

Mar. 23, 2022 (DE) .......................... 102022106839.0
Apr. 29, 2022 (DE) .......................... 102022110557.1

(51) Int. Cl.
*H01Q 1/12* (2006.01)
(52) U.S. Cl.
CPC ................. *H01Q 1/1214* (2013.01)
(58) Field of Classification Search
CPC .... B60R 16/0222; H01Q 1/1214; H01Q 1/32; H01Q 1/02; H01Q 1/22; H01R 13/5202
USPC ........................................................ 174/154
See application file for complete search history.

(56) References Cited

U.S. PATENT DOCUMENTS

| 6,064,003 A | 5/2000 | Moore et al. |
| 7,415,265 B2 | 8/2008 | Noro et al. |
| 9,966,659 B2 | 5/2018 | Chakam et al. |
| 2004/0174312 A1* | 9/2004 | Wiedmann ............. H01Q 21/28 343/711 |
| 2007/0075904 A1* | 4/2007 | Blickle ................ H01Q 1/3275 343/715 |

(Continued)

FOREIGN PATENT DOCUMENTS

| CN | 104691452 A | 6/2015 |
| DE | 10313285 B3 | 1/2005 |

(Continued)

OTHER PUBLICATIONS

Korean Office Action dated Jan. 22, 2024 with English translation, corresponding to Application No. 10 2023 0037426, 12 pages.

(Continued)

*Primary Examiner* — Timothy J Thompson
*Assistant Examiner* — Michael F McAllister
(74) *Attorney, Agent, or Firm* — Laurence A. Greenberg; Werner H. Stemer; Ralph E. Locher (57) ABSTRACT

An antenna sealing plug for a flexible antenna interconnect device includes a sealing surface extending around the antenna sealing plug in a circumferential direction and sealing a feed-through of a vehicle that leads into the vehicle, and a slot-like passage. A feedthrough portion of the flexible antenna interconnect device can be guided through the feed-through of the vehicle. The feedthrough portion of the flexible antenna interconnect device can be guided through the slot-like passage of the antenna sealing plug in a sealing manner.

20 Claims, 6 Drawing Sheets

(56) References Cited

U.S. PATENT DOCUMENTS

2007/0120755 A1* 5/2007 Blickle ............... H01Q 1/3275
                                                                    343/872
2013/0323946 A1    12/2013 Ritner

FOREIGN PATENT DOCUMENTS

| DE | 202020100515 U1 | 3/2020 |
|----|-----------------|--------|
| JP | H04058034 U | 5/1992 |
| JP | H07283557 A | 10/1995 |
| JP | H08009538 A | 1/1996 |
| JP | 2004328839 A | 11/2004 |
| JP | 2005110198 A | 4/2005 |
| JP | 2010052499 A | 3/2010 |
| JP | 2010232054 A | 10/2010 |
| JP | 20120121423 A | 6/2012 |
| JP | 2015516786 A | 6/2015 |
| JP | 2017168938 A | 9/2017 |

OTHER PUBLICATIONS

Japanese Office Action dated Feb. 15, 2024 with English translation, corresponding to Application No. 2023-043789, 8 pages.
German Office Action, Application No. 10 2022 110 557.1, Dated: May 25, 2022, 5 pages.

* cited by examiner

ANTENNA SEALING PLUG AND ANTENNA DEVICE FOR A VEHICLE

CROSS-REFERENCE TO RELATED APPLICATIONS

This application claims the benefit of the filing date under 35 U.S.C. § 119(a)-(d) of German Patent Application No. 102022106839.0, filed on Mar. 23, 2022, and German Patent Application No. 102022110557.1, filed on Apr. 29, 2022.

FIELD OF THE INVENTION

The invention relates to an antenna sealing plug for a flexible antenna interconnect device of an antenna device, for a vehicle.

BACKGROUND

Known antennas with flexible antenna interconnect devices, which may be used in a damp and/or wet region of a vehicle, such as a motor vehicle, for example in a spoiler, are often sealed with respect to a feed-through, which guides the antenna interconnect device into the vehicle, by a hot melt adhesive. A problem with this is that, in many cases, the hot melt adhesive does not meet the increased temperature requirements on/in a vehicle, its sealing properties do not fully satisfy the product requirements, and the processing time is long. A tool is furthermore required for supplying the hot melt adhesive.

CN 104 691 452 A discloses an installation device in a roof of a motor vehicle for an antenna feed, which guides the antenna feed into an interior of the motor vehicle and is intended to prevent water from penetrating into the motor vehicle. In this case, a hollow stud is mounted in the roof, in the outer end of which hollow stud a slot is arranged, through which the antenna feed is guided into the hollow stud and, from there, into the interior. A seal plug, through which the antenna feed is guided, is arranged in the hollow stud and is seated on an inner wall of the hollow stud in a sealing manner. A sealing material is furthermore provided in the outer portion of the hollow stud and a water-tight cap is mounted on the outside of the hollow stud.

JP 2010-52499 A discloses an antenna device on a spoiler of a vehicle, wherein an antenna feed of the antenna device is guided inwards, through a feed-through, into the vehicle, where the antenna cable comprises an electrical connector. To prevent moisture from penetrating into the vehicle, a sealing rubber element is mounted on an inner edge of the feed-through into the vehicle, wherein the feed-through may be sealed by a screw-on cover. The antenna feed is guided through a bushing on a side of the rubber element and through the rubber element. During mounting of the antenna device, the bushing, with the antenna cable located therein, is sealed from the outside with a hot melt adhesive in order to ensure that water does not penetrate into the feed-through.

The previous options for mounting an antenna device, for example in a spoiler on a vehicle, in particular a motor vehicle, do not always meet the vehicle requirements and the manufacturers' specifications. The conventional methods are furthermore time-consuming and costly.

SUMMARY

An antenna sealing plug for a flexible antenna interconnect device includes a sealing surface extending around the antenna sealing plug in a circumferential direction and sealing a feed-through of a vehicle that leads into the vehicle, and a slot-like passage. A feedthrough portion of the flexible antenna interconnect device can be guided through the feed-through of the vehicle. The feedthrough portion of the flexible antenna interconnect device can be guided through the slot-like passage of the antenna sealing plug in a sealing manner.

BRIEF DESCRIPTION OF THE DRAWINGS

Exemplary embodiments of the invention are described by way of the following drawings. In the drawings.

DETAILED DESCRIPTION OF THE EMBODIMENT(S)

The invention is explained in greater detail below on the basis of exemplary embodiments with reference to the appended drawings which are diagrammatic and not to scale. Portions, elements, component parts, units, components and/or patterns which have an identical, unique or analogous configuration and/or function are identified by the same reference signs in the description of the figures and in the figures. A possible alternative which is not explained, is not shown in the drawing and/or is not definitive, a static and/or kinematic reversal, a combination etc. with respect to the exemplary embodiments of the invention or a component, a pattern, a unit, a component part, an element or a portion thereof, can further be gathered from the description of the figures.

In the case of the invention, a feature (portion, element, component part, unit, component, function, variable etc.) can be of positive configuration, that is to say present, or of negative configuration, that is to say absent. In this specification (description, patent claims, drawings), a negative feature is not explained explicitly as a feature if value is not placed on it being absent according to the invention. That is to say, the invention which is actually created, and not one constructed by the prior art, consists in omitting the said feature.

A feature of this specification can be utilized not only in a specified manner and/or way, but rather also in another manner and/or way (isolation, combination, replacement, addition, on its own, omission, etc.). It is possible, in particular, in the description, the patent claims and/or the drawing, to replace, add or omit a feature in the patent claims and/or the description on the basis of a reference sign and a feature which is assigned to it, or vice versa. Furthermore, a feature in a patent claim can be interpreted and/or specified in greater detail as a result.

The features of the description can also be interpreted as optional features (in view of the (initially mostly unknown) prior art); that is to say, each feature can be considered to be an optional or arbitrary feature, that is to say a feature which is not mandatory. Therefore, a separation of a feature, possibly including its periphery, from an exemplary embodiment is possible, it then being possible for the feature to be transferred to a generalized inventive concept. The absence of a feature (negative feature) in an exemplary embodiment shows that the feature is optional in relation to the invention. Furthermore, in the case of a type term for a feature, a generic term for the feature can also be implicitly understood (possibly further hierarchical breakdown into subgenus, etc.), as a result of which a generalization of the feature is possible, for example with consideration of equivalent effect and/or equivalence.

The invention is explained in more detail below with reference to exemplary embodiments of five embodiments (FIGS. 1 and 2, FIGS. 3 to 5, FIG. 6, FIGS. 7 and 8, FIGS. 9 and 10) of a variant of an elastic antenna sealing plug 2 for a flexible feedthrough portion 110 of a substantially flexible antenna interconnect device 1 (FIG. 11) for an antenna device 0 for a vehicle, in particular a motor vehicle. The antenna interconnect device 1 comprises, in particular, an actual transmitter antenna and/or receiver antenna and may be configured as an antenna interconnect device 1 with a flat extent. The flexible and, itself, optionally flat feedthrough portion 110 here should be mountable and mounted in a feed-through 9 of the vehicle which leads into the vehicle. The antenna sealing plug 2 here should or must seal the feed-through 9 with respect to a liquid on the one hand and should or must seal the feedthrough portion 110 with respect to a liquid on the other.

The antenna sealing plug 2 is, in particular, not produced from a hot melt adhesive, but, for example, from a thermoplastic elastomer, terpolymer or synthetic rubber, whereby a material of the antenna sealing plug 2 also meets increased requirements in terms of its environmental behavior (temperature requirements, sealing properties etc.), durability and mechanical properties. This furthermore means that, for provision of the antenna sealing plug 2, i.e. for prefabricating an antenna device or mounting the antenna device, a production tool for the antenna sealing plug 2 is not required. A sealing tool for processing the entire antenna in the final assembly phase is therefore not required. That is to say, rapid mounting may take place, wherein the antenna interconnect device 1 (antenna foil) does not have to be placed in a tool.

Figure 11:
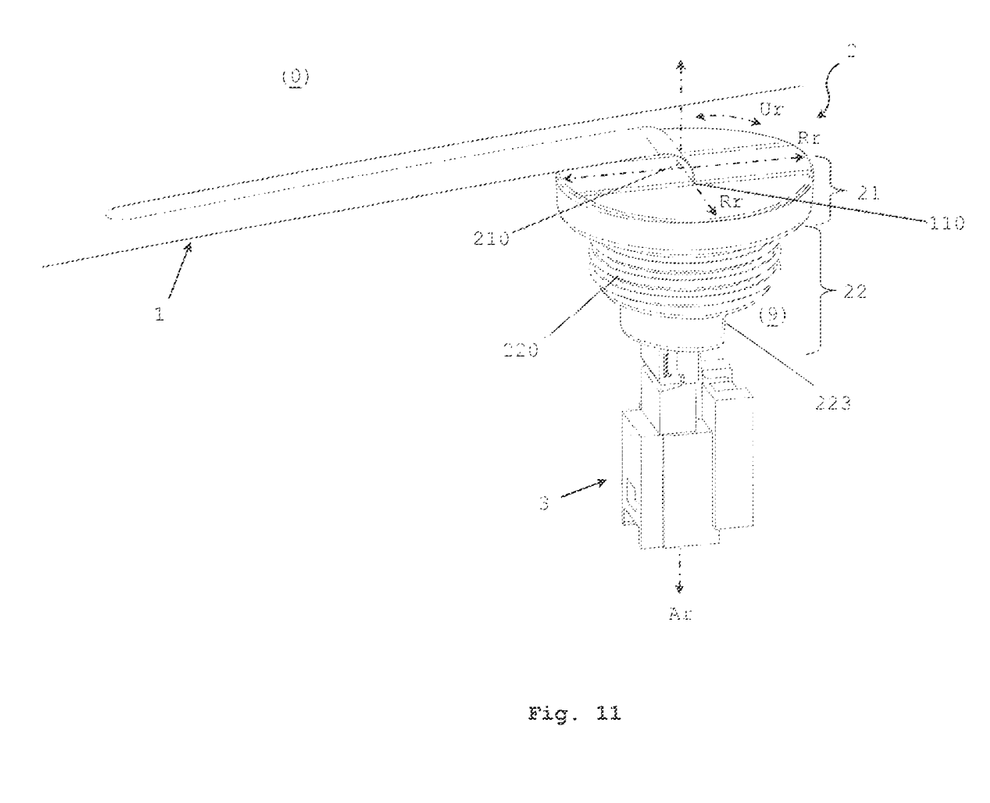
FIG. 11 is a perspective view of an antenna sealing plug according to the invention according to the third, fourth or fifth embodiment, wherein a region of the antenna interconnect device of an antenna device is shown.

The antenna device 0 with its flexible interconnect device 1 (c.f. FIG. 11) is mountable or mounted on/in a vehicle add-on part, in particular a motor vehicle add-on part, for example a spoiler or other add-on part. The vehicle add-on part is in turn mountable or mounted at/on/in a vehicle, wherein the flexible feedthrough portion 110 of the antenna interconnect device 1 is mountable or mounted in the feed-through 9 by the antenna sealing plug 2, wherein a portion of the antenna interconnect device 1 projects into the vehicle.

The antenna device 0 according to the invention comprises the antenna interconnect device 1 and the antenna sealing plug 2, wherein the antenna sealing plug 2 is configured according to the invention.

The vehicle add-on part according to the invention, in particular the motor vehicle add-on part according to the invention, such as the spoiler, comprises the antenna sealing plug 2 and/or an antenna device 0, wherein the antenna sealing plug 2 and/or the antenna device 0 is or are configured according to the invention. A vehicle is understood to be a motor vehicle (road vehicle), a rail vehicle, a water vehicle or an aircraft. The motor vehicle here may comprise an internal combustion engine and/or an electric traction engine.

In this case, the antenna interconnect device 1—configured, for example, as a signal carrier, ribbon cable carrier, printed cable, sensor line etc.—may have a connector 3, for example for on-board electronics of the vehicle. The flexible antenna interconnect device 1 comprises, for example, a flexible substrate as an interconnect device or antenna carrier, a flexible conductive circuit structure or antenna structure and a flexible, insulating cover layer. The antenna interconnect device 1 may be configured in particular as a populated antenna interconnect device, or possibly also as an unpopulated antenna interconnect device.

Although the invention is described and illustrated further in greater detail by way of exemplary embodiments, the invention is not restricted by way of the disclosed exemplary embodiments, but rather is of more fundamental nature. Other variations can be derived therefrom without departing from the scope of protection of the invention. The explanation of the invention with reference to the drawings furthermore relates hereinafter to an axial direction Ar or a center axis Ar, a radial direction Rr and a circumferential direction Ur of the antenna sealing plug 2. The invention can be generally used in the field of vehicle antennas, in particular in external or integrated roof antenna modules for motor vehicles. The drawing shows only those spatial portions of the subject matter of the invention which are necessary for understanding the invention.

Figure 3:
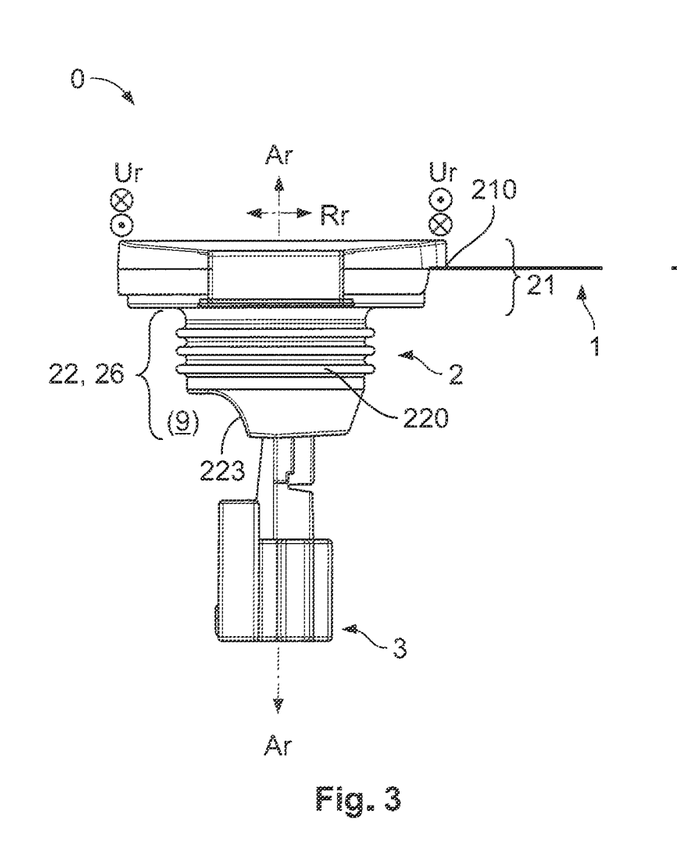
FIG. 3 is a side view of a second embodiment of the antenna sealing plug according to the invention in a closed state.
Figure 4:
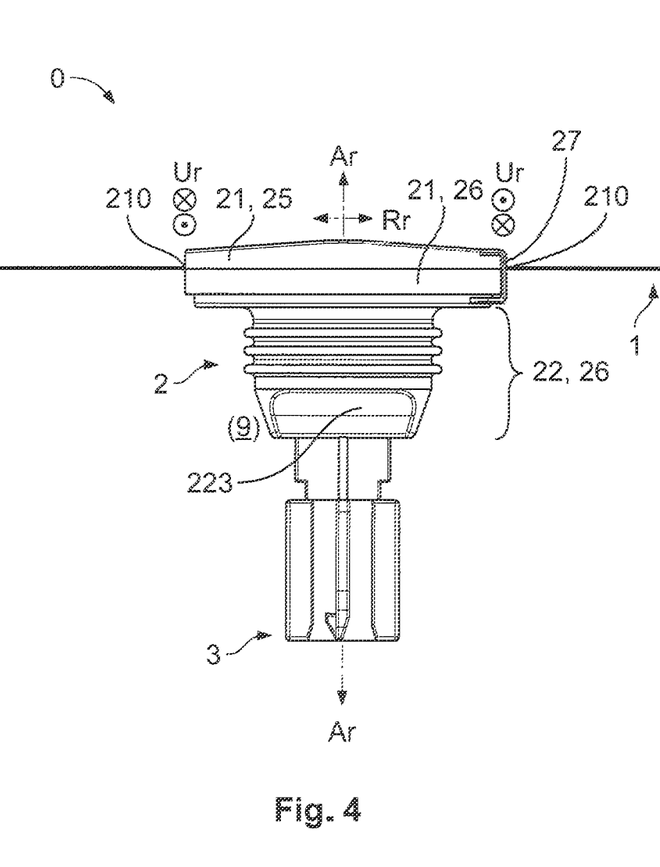
FIG. 4 is another side view of the second embodiment of the antenna sealing plug in the closed state.
Figure 5:
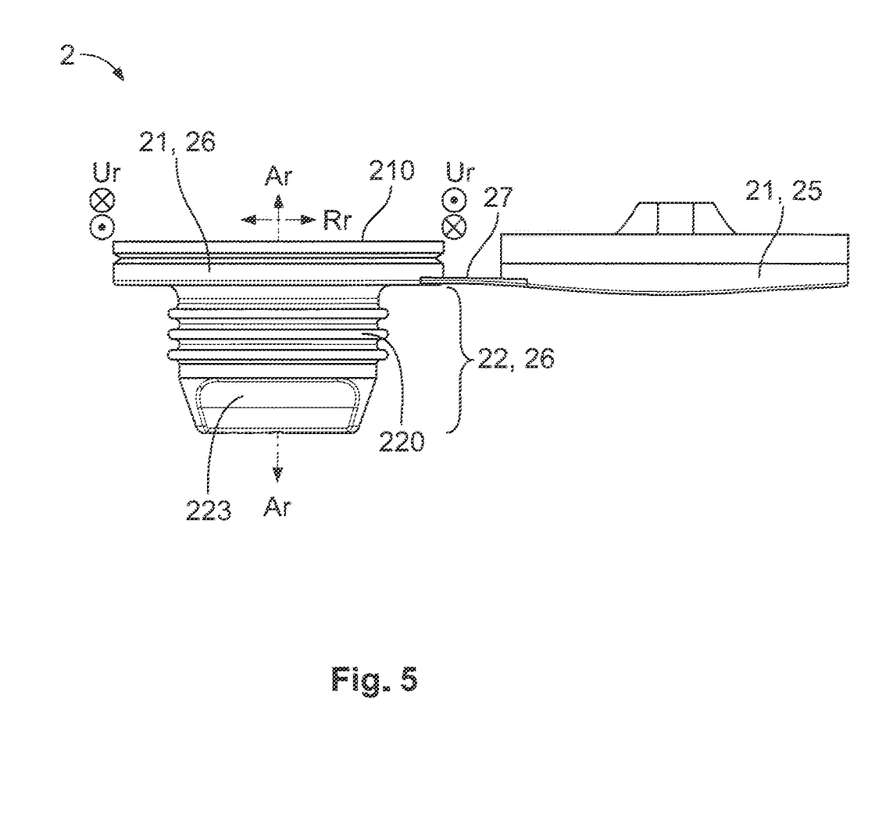
FIG. 5 is a side view of the second embodiment of the antenna sealing plug in an open state.
Figure 6:
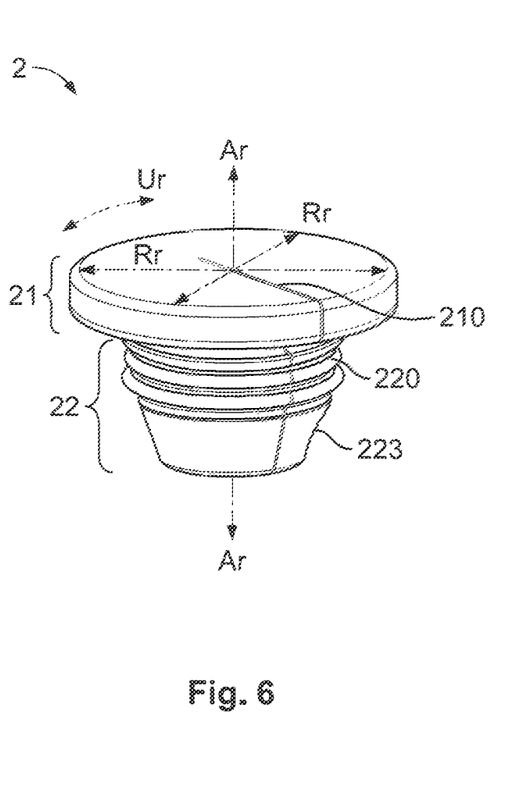
FIG. 6 is a perspective view of a third embodiment of the antenna sealing plug according to the invention for a flexible feedthrough portion of the antenna interconnect device.
Figure 7:
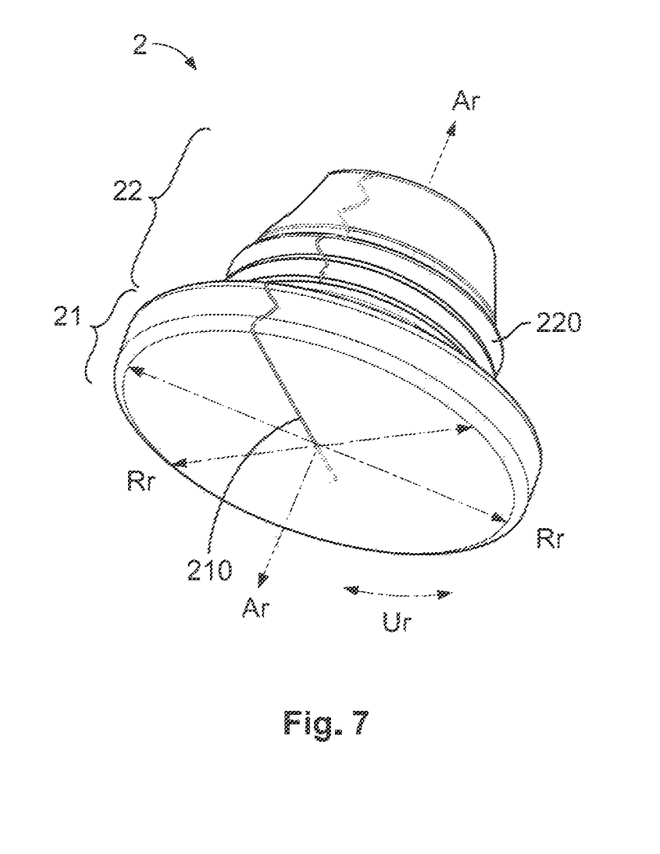
FIG. 7 is a perspective view of a fourth embodiment of the antenna sealing plug according to the invention.
Figure 8:
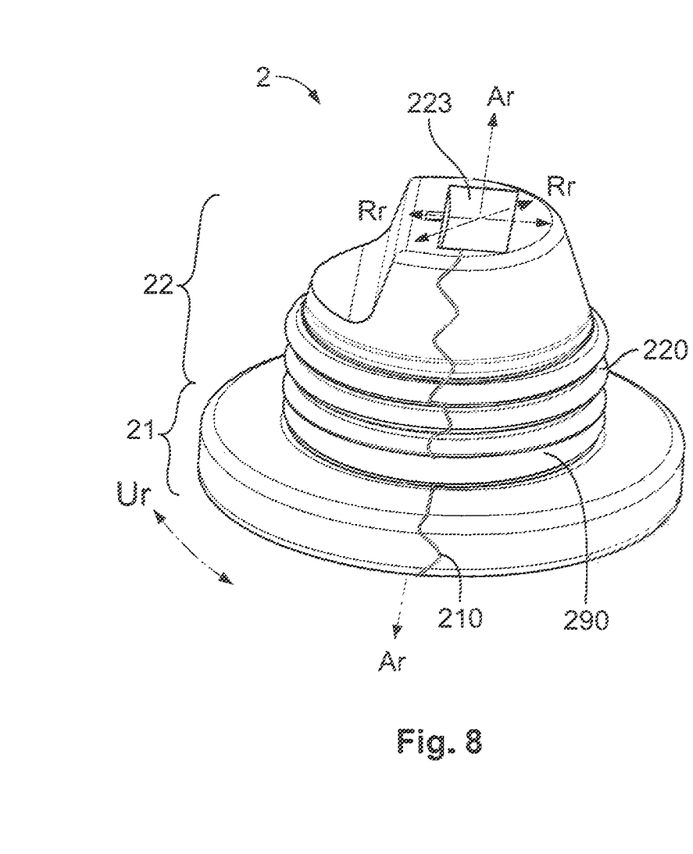
FIG. 8 is another perspective view of the fourth embodiment of the antenna sealing plug.

The antenna sealing plug 2 comprises two mutually separate sealing portions or regions. The two portions here are separated from one another or can be separated from one another by a plane which extends substantially exclusively in the radial directions of the antenna sealing plug 2 (c.f. FIGS. 3 to 5). Alternatively, the two portions may be separated from one another by a possibly curved, for example undulating, half plane, which starts inside the antenna sealing plug 2 and extends in the radial direction and/or in the axial direction of the antenna sealing plug 2 (c.f. FIGS. 6 to 8). The two portions may be configured to complement one another, at least in part, and/or be joined together in a form-fitting manner, at least in part (c.f. FIGS. 3 to 8).

On the one hand, the antenna sealing plug 2 comprises a sealing surface 220 extending substantially all the way round in the circumferential direction Ur for sealing with respect to the feed-through 9 of the vehicle. The form of the circumference here is fundamentally arbitrary, although a substantially circular or elliptical form may be used.

On the other hand, the antenna sealing plug 2 comprises a slot-like passage 210. The flexible feedthrough portion 110 of the antenna interconnect device 1 can be guided or is guided through the antenna sealing plug 2 in a sealing manner via this slot-like passage 210. That is to say, when the feedthrough portion 110 is mounted in the slot-like passage 210, a liquid cannot pass from one axial side of the antenna sealing plug 2 to the other axial side of the antenna sealing plug 2 through the slot-like passage 210.

Figure 1:
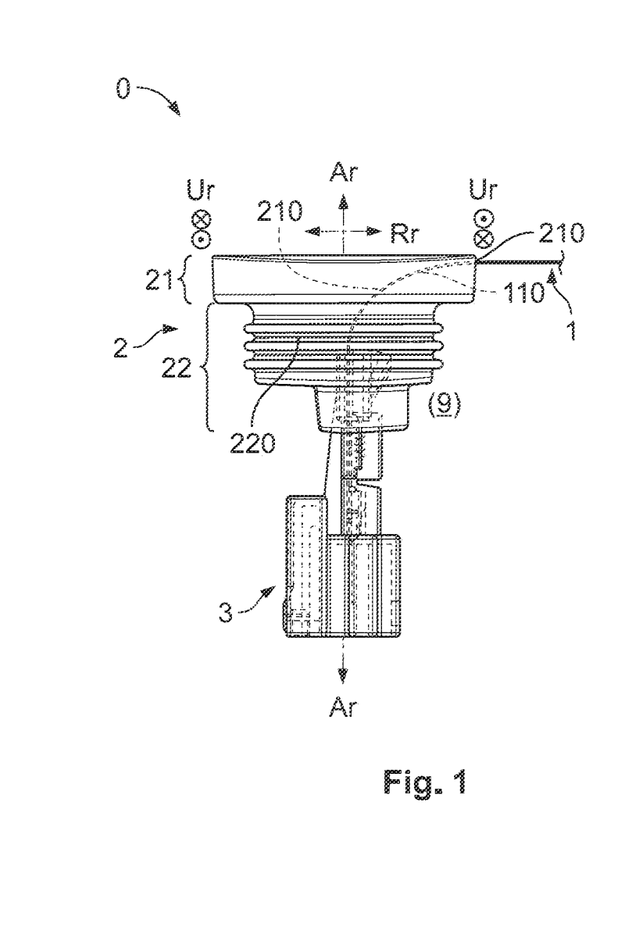
FIG. 1 is a side view of a first embodiment of an antenna sealing plug according to the invention for a flexible antenna interconnect device.
Figure 2:
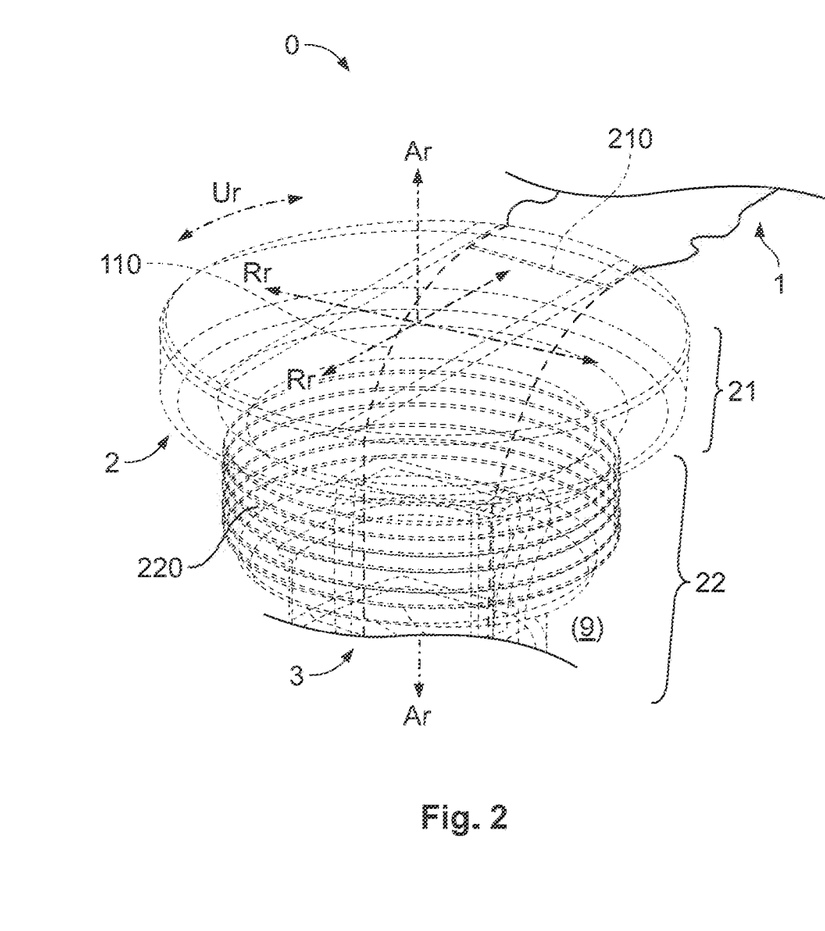
FIG. 2 is a perspective view of the first embodiment of the antenna sealing plug.

The slot-like passage 210 here may be arranged in the antenna sealing plug 2 in a variety of ways; four of these embodiments are explained in more detail below. In this regard, it is, for example, possible (c.f. FIGS. 1 and 2) to configure the slot-like passage 210 as a channel which is completely closed in its circumferential direction, at least in certain longitudinal portions, and which has an expanded rectangular cross section (c.f. FIG. 2), for example. The slot-like passage 210 here comprises at least or precisely two openings in the antenna sealing plug 2, wherein the feedthrough portion 110, coming from one such opening, is moved through the slot-like passage 210 so as to be mounted.

A cross section of the sealing slot-like passage 210 may, or may not, be adapted to a cross section of the feedthrough portion 110. In the first case, analogously to an expanded rectangular cross section of the feedthrough portion 110, for example, the cross section of the slot-like passage 210 has an analogous cross section, for example. In the second case, the slot-like passage 210 is merely constituted by two substantially parallel surfaces, for example.

The antenna sealing plug 2 (c.f. FIGS. 3 to 5) may furthermore be mainly or substantially formed in two parts. The slot-like passage 210 here can be arranged between these two parts of the antenna sealing plug 2, and is arranged between these two parts of the antenna sealing plug 2 when the feedthrough portion 110 has been mounted. To this end, the feedthrough portion 110 is placed in one of the two parts and the second part closes the first part so that the antenna sealing plug 2 is fully operational.

In an embodiment, the material of the antenna sealing plug 2 extends completely around the feedthrough portion 110 at at least one point guarantees a tightness of a region locally upstream of this point (for example outside the antenna sealing plug 2, for instance in a spoiler or another add-on part) with respect to a region locally downstream of this point (for example outside the antenna sealing plug 2, for instance in the vehicle).

The slot-like passage 210, which can be arranged between the two parts, may be suitable for only one circumferential position or a plurality of circumferential positions of the feedthrough portion 110 with respect to the antenna sealing plug 2. For example, circumferential positions established between the two parts, which can be provided once or multiple times with an offset of approximately 30°, 45°, 60° or 90°. It is furthermore possible to provide a continuous region for circumferential positions of the feedthrough portion 110 of approximately 45°, 60°, 90°, 135°, 150°, 180°, 225°, 270°, 315°, 360°, i.e. smaller than or up to 360°, in which the feedthrough portion 110 may be arranged between the two parts.

It is, for example, furthermore possible (c.f. FIG. 6) to configure the slot-like passage 210 of the antenna sealing plug 2 as a laterally open slot-like channel. The slot-like channel here extends laterally into the antenna sealing plug 2 in the radial direction Rr and in an embodiment completely through the antenna sealing plug 2 in the axial direction Ar. The slot-like passage 210 here comprises three openings in the antenna sealing plug 2, wherein the feedthrough portion 110, coming from one such opening, in particular the lateral opening, is moved into the antenna sealing plug 2 (lateral opening) or through the antenna sealing plug 2 (opening on an axial side). In the latter exemplary embodiment, the antenna sealing plug 2 may already be mounted in the feed-through 9.

Moreover, it is possible for the slot-like passage 210, which is arranged substantially linearly in the antenna sealing plug 2 in FIG. 6, to not only be arranged linearly in the antenna sealing plug 2. In FIGS. 7 and 8, the slot-like passage 210 of FIG. 6 is arranged in the antenna sealing plug 2 as an undulating slot-like passage 210. The number of undulations here is arbitrary and, of course, starts with one. Other options for arranging a slot-like passage 210 in the antenna sealing plug 2 can, of course, be used according to the invention.

A surface which is spanned by the slot-like passage 210 in the antenna sealing plug 2 may extend within the antenna sealing plug 2 in the radial direction and axial direction of the antenna sealing plug 2 (c.f. for example FIGS. 1, 2 and 5). This surface may be constituted as a curved surface within the antenna sealing plug 2, with a linear section as a generatrix. That is to say, the surface spanned by the slot-like passage 210 is configured as a developable surface. This surface may furthermore extend within the antenna sealing plug 2 at least partially in the circumferential direction of the antenna sealing plug 2. That is to say, the surface spanned by the slot-like passage 210 is configured as a circumferential portion of a funnel or of a cone portion or as a funnel or a cone portion. A curved surface which is spanned by the sealing slot-like passage 210 may begin or end on the radial outer side of the antenna sealing plug 2, progress substantially in a radial direction in a radial outer region in the antenna sealing plug 2, bend increasingly within the antenna sealing plug 2 in the axial direction of the antenna sealing plug, progress substantially in the axial direction in an axial outer region in the antenna sealing plug 2, and/or end or begin on the axial outer side of the antenna sealing plug 2.

A surface which is spanned by the slot-like passage 210 in the antenna sealing plug 2 may extend into the antenna sealing plug 2 from an axial outer position on the antenna sealing plug 2. The surface here may extend in the axial direction in the antenna sealing plug 2 as a substantially planar or undulating surface. Furthermore, a linear section as a generatrix of the surface here may extend into the antenna sealing plug 2 substantially only in the radial direction of the antenna sealing plug 2 (c.f. for example FIGS. 6 to 8). The surface may furthermore reach as far as a center axis of the antenna sealing plug 2 or intersect this center axis. That is to say, in the latter case, the surface extends into the antenna sealing plug 2 beyond the center axis. The surface may moreover also "pass by" the center axis.

In an embodiment, the antenna sealing plug 2 (c.f. FIGS. 1 to 8) is divided into at least two portions, a plug head 21 which is wider in the radial direction Rr and a plug body 22 which is narrower than the plug head in the radial direction Rr. This gives the antenna sealing plug 2 a mushroom-like appearance with a flat plug head 21, in which the outer diameters may be constant in the axial direction Ar, and a somewhat narrower, and instead taller, plug body 22, in which the outer diameters may be substantially constant in the axial direction Ar, at least in certain portions (sealing element).

The plug body 22 here has, on the radial Rr outer side, the sealing surface 220 extending substantially all the way round in the circumferential direction Ur for sealing the feed-through 9. The sealing surface 220 may be arranged partially or substantially completely over an entire axial Ar length on the outside of the plug body 22. The sealing surface 220 comprises integral sealing elements, e.g. sealing lips, sealing ribs etc., extending, for example, substantially all the way round in the circumferential direction Ur.

On the one hand, the slot-like passage 210 enters at/in the plug head 21 or at/in a transition portion of the plug head 21 and the plug body 22 (at the top in each case in FIGS. 1 to 6 and at the bottom in each case in FIGS. 7 and 8, with reference to the orientated plane of the drawing). The slot-like passage 210 may lead in or out substantially radially Rr (c.f. FIGS. 1 to 5) or substantially axially Ar (c.f. FIGS. 6 to 8) at/in the opening into the plug head 21. A combination of a radial Rr and axial Ar, i.e. an angled or inclined lead-in or lead-out into/out of the plug head 21 can, of course, also apply.

On the other hand, the slot-like passage 210 enters at/in the plug body 22 (at the bottom in each case in FIGS. 1 to 6 and at the top in each case in FIGS. 7 to 8, with reference to the orientated plane of the drawing). The slot-like passage 210 here may lead in or out substantially axially Ar (c.f. the drawing) at/in the opening into the plug head 21. A combination of a radial Rr and axial Ar, i.e. an angled or inclined (not illustrated) lead-in or lead-out into/out of the plug body 22 can, of course, also apply.

In particular, the slot-like passage 210 on/in the plug body 22 leads within a receptacle 223 for the connector 3 (c.f. FIGS. 1, 2 and 7 to 10). The antenna interconnect device 1 here may comprise electrical terminals, in particular terminals which are crimped thereto and which are received in the connector 3. The receptacle 223 of the antenna sealing plug may be configured to complement the connector 3, at least in part. The connector 3 may be insertable or inserted or placeable or placed into the receptacle 223 in a form-fitting manner, at least in part. At least one internal dimension of the receptacle 223 here is smaller than a corresponding external dimension of the connector 3. As a result of the elastic material of the antenna sealing plug 2, the connector 3 may be received in the receptacle 223 in a simple, clamped manner. Depending on the requirements for receiving the connector 3 in the antenna sealing plug 2, the material of this latter (in terms of its hardness and/or other properties) may be adapted to a property of the connector 2 and/or a subsequent property on the component and/or vehicle. A unit comprising the antenna sealing plug 2 with the antenna interconnect device 1 and the connector 3 may be sealed directly here and produce an electrical connection in the intended component or vehicle.

The antenna sealing plug 2 may be conceived substantially as a single part (c.f. FIGS. 1, 2, 6 to 8) or substantially in two parts (c.f. FIGS. 5 to 7). An integral configuration is understood to mean a configuration of the antenna sealing plug 2 in which there is only one single component, which cannot be divided without being destroyed. The antenna sealing plug 2 is manufactured from a single initial mass (plastic melt), which, for the antenna sealing plug 2, must itself be integral. Such a fully functional antenna sealing plug 2 is merely held together by adhesion and/or cohesion.

In the case of the single-part, integral configuration, the antenna sealing plug 2 may be configured as an antenna sealing plug 2 in which a slot is made from the outside. A relevant slot which can be seen on the outside of the sealing plug 2, i.e. the slot-like passage 210, may show only radially Rr on the plug head 21 (c.f. FIGS. 1 and 2) or on the transition portion of the plug head 21 and the plug body 22 (not illustrated), only axially Ar (c.f. FIGS. 6 to 8) on the plug body 22, and possibly radially Rr on the plug body 22 (c.f. FIGS. 6 to 8, although it is not shown).

In the case of the two-part configuration, the antenna sealing plug 2 may be constructed as an integral part (hinge 27, in particular film hinge 27, c.f. FIGS. 3 to 5) or from two pieces. The antenna sealing plug 2 here (c.f. FIGS. 3 to 5) may be divided into a plug cap 25; 25, 21 and a cup-like plug portion 26; 26, 21, 22. The plug cap 25 here may divide the plug head 21 into two axial Ar portions (dividing plane), wherein one portion of the plug head 21 forms the plug cap 25 and the other portion of the plug head 21, together with the plug body 22, forms the cup-like plug portion 26; 26, 21, 22.

In the case of the integral configuration of the plug cap 25 and cup-like plug portion 26 (c.f. FIGS. 3 to 5), the integral hinge 27, in particular the integral film hinge 27, may, on the one hand, be arranged on the antenna sealing plug 2 on a radial Ra and/or axial Ar outer side of the plug cap 25 and on a radial Ra and/or axial Ar outer side of the cup-like plug portion 26. In the case of the two-piece configuration of the plug cap 25 and cup-like plug portion 26, these may be configured with respect to one another in such a way that the plug cap 25 may be pushed onto/into the cup-like plug portion 26 in any circumferential position.

The plug cap 25 and the cup-like plug portion 26 are configured with respect to one another in such a way that the plug cap 25, when pushed onto/into the cup-like plug portion 26, ensures that the two parts automatically remain connected to one another. That is to say, for example, in the joined-together state of the plug cap 25 and the cup-like plug portion 26, the plug cap 25 latches on/in the cup-like plug portion 26 and/or the two may be otherwise connected to one another in a mutually fixed manner.

The slot-like passage 210 in the antenna sealing plug 2 may begin or end on the radial Rr (c.f. FIGS. 1 to 5 of the drawing) outer side or axial Ar (c.f. FIGS. 6 to 8 of the drawing) outer side of the plug head 21. Analogously, the slot-like passage 210 may end or begin on the axial Ar (FIGS. 1 to 8) outer side of the plug head 21, wherein the slot-like passage 210 may end or begin in the receptacle 223 for the connector 3. Between a beginning and end or an end and beginning of the slot-like passage 210 in the antenna sealing plug 2, the slot-like passage 210 may fundamentally lead through the antenna sealing plug 2 in any desired manner.

In an embodiment, at the entry, in the passage and at the exit for the feedthrough portion 110 into/through/from the antenna sealing plug 2, radii can be used to prevent the feedthrough portion 110 from kinking. It is therefore possible, for example, (c.f. FIGS. 1 and 2 (analogously FIGS. 3 to 5)) to have the lead-through portion 110 enter the antenna sealing plug 2 radially Rr at top. Within the antenna sealing plug 2, the feedthrough portion 110 then bends increasingly in the axial direction Ar with a comparatively large or substantially maximum radius and exits the antenna sealing plug 2 substantially in the axial direction Ar.

The use of radii so that the slot-like passage 210 does not kink may also depend, in particular, on an environment of the feed-through 9. For example, an embodiment according to FIGS. 6 to 8 can therefore be used if the feedthrough portion 110 is coming from an axial direction Ar. An embodiment according to FIGS. 1 to 5 can, for example, then be used (as shown in FIGS. 1 to 4) if the feedthrough portion 110 comes from a radial direction Rr. Exceptions here are, of course, feedthrough portions 110 which may already be bent with small radii or already have such small radii (kinks).

The plug body 22 may comprise, at its free axial Ar end portion, the receptacle 223 for the connector 3. The receptacle 223 here should preferably be configured in such a way that the connector 3 may be clamped in the receptacle 223.

This may take place, for example, by configuring portions of the receptacle 223 in a form-fitting manner with respect to the connector 3. In an embodiment, at least one internal dimension of the receptacle 223 is smaller than a corresponding external dimension of the connector 3 so that the connector 3 may be clamped, in particular clamped in a form-fitting manner, in the receptacle 223 owing to the elastic material of the receptacle 223.

The antenna sealing plug 2 which is pre-mounted on the feedthrough portion 110 and/or the antenna sealing plug 2 which has been mounted in the feed-through 9 during final assembly may furthermore comprise a securing element 290, by which a mechanical contact pressure can be applied to the feedthrough portion 110. This is only shown in FIG. 8, although it may apply to all embodiments of the invention.

Figure 9:
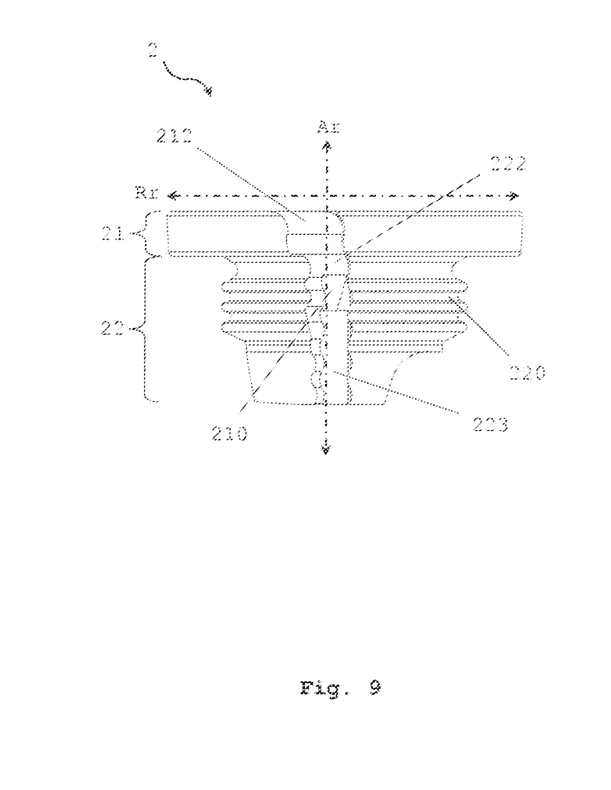
FIG. 9 is a side view of a fifth embodiment of an antenna sealing plug according to the invention.
Figure 10:
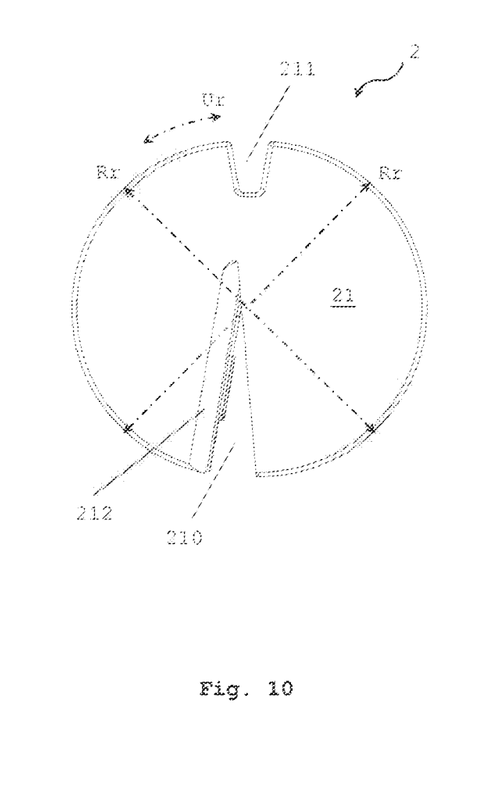
FIG. 10 is a plan view of the fifth embodiment of the antenna sealing plug.

FIGS. 9 and 10 show an embodiment of the antenna sealing plug 2 (pre-mounting position) with an open slot-like passage 210. The feedthrough portion 110 may thus be arranged in the slot-like passage 210 and in the antenna sealing plug 2 in a simple and positionally accurate manner and the antenna sealing plug 2 may then be pre-mounted (for example with the securing element 290) or mounted (in the feed-through 9) in the final assembly.

The antenna sealing plug 2 furthermore does not comprise hot melt adhesive. The antenna sealing plug 2 is produced in particular from an elastic material, such as an elastomer. The antenna sealing plug 2, in its pre-mounting position on the flexible antenna interconnect device 1 or the feedthrough portion 110 thereof, may comprise the securing element 290, by which a mechanical contact pressure can be applied to the antenna interconnect device 1 or the feedthrough portion 110 thereof. Such a securing element 290 may be formed, for example, as a securing ring, a snap ring, an O ring, a clamp, a (spring) clip, etc. A mounted securing element 290 here may be mounted on the outside of the antenna sealing plug 2 and extends around the outside of the antenna sealing plug 2, at least over part of its circumference, in particular as an O ring.

The open slot-like passage 210 extends, in particular, completely through the antenna sealing plug 2 in the axial direction Ar and, in particular, into the antenna sealing plug 2 in the radial direction Rr, wherein, in the pre-mounting position, the open slot-like passage 210 extends in the antenna sealing plug 2 such that it tapers in particular in the radial direction Rr. That is to say, the slot-like passage 210 opens outwards in the radial direction Rr. In a plan view of the antenna sealing plug 2, the open slot-like passage 210 has the approximate form of a triangle.

None, at least one (represented approximately in FIG. 10) or both inner flanks of the open slot-like passage 210 may be aligned in the direction of the center of the slot-like passage 210, reach the center of the slot-like passage or extend beyond the center of the slot-like passage (c.f. FIG. 10). In a specific form for its function, the antenna sealing plug 2 may be configured with an open slot-like passage 210 as a rotationally symmetrical or only approximately rotationally symmetrical body; which may also apply to the other embodiments of the invention. If such an antenna sealing plug 2 is configured only as an approximately rotationally symmetrical body, it may be configured in such a way that it has a substantially rotationally symmetrical form when its slot-like passage 210 is closed.

The open slot-like passage 210 is closed during mounting or pre-mounting of the antenna sealing plug 2. This closed position may be achieved and ensured by the securing element 290 and/or the feed-through 9. The open slot-like passage 210 can be combined, in particular, with the embodiments according to FIGS. 6 to 8. The antenna sealing plug 2 may furthermore have any desired form, so long as it may be arranged in the feed-through 9 such that the feedthrough portion 110 is sealed with respect to the sealing plug itself 2 and the sealing plug itself 2 is sealed.

FIGS. 9 and 10 furthermore each show an undulating slot-like passage 210. An undulation of the slot-like passage 210 is arranged within the antenna sealing plug 2 in at least one axial Ar outer (212) or inner (222) region of the antenna sealing plug 2 in such a way that the feedthrough portion 110 of the antenna interconnect device 1 can be guided or is guided in a desired direction. That is to say, a passage portion 212, 222 of an outer or inner undulation (as seen in the axial direction) of the undulating slot-like passage 210 is arranged in the antenna sealing plug 2 in such a way that the passage portion 212, 222 allows the feedthrough portion 110 of the antenna sealing carrier 1 to face in the direction of an installation position. This can of course also be applied to slot-like passages 210 without undulations.

For example, a radius 212, 222, a progression 212, 222 or an end 212, 222 of an outer (212) and/or inner (222) undulation (passage portion 212, 222) located in the antenna sealing plug 2 or an outer and/or inner portion (passage portion 212, 222) for the feedthrough portion 110 in the antenna sealing plug 2 may be arranged in such a way that, on the one hand, the feedthrough portion 110 can be guided without deflections, for example with a large radius, or at a relatively small angle, with respect to the rest of the antenna interconnect device 1 (passage portion 212, c.f. FIG. 11), and/or, on the other hand, can be guided without deflections, for example with a comparatively large radius, to the connector 3 in the antenna sealing plug 2 (c.f. FIG. 9), another connector or a connection in the vehicle.

FIG. 10 furthermore shows a coding 211 for the antenna sealing plug 2. The coding 211 here is configured as a coding 211 extending into the antenna sealing plug 2 in the radial direction Rr. A radial projection as a coding 211 can, of course, likewise be used. In the present case, the coding 211 is arranged in/on the plug head 211; it may, of course, also be additionally or alternatively provided in/on the plug body 22, in/on the plug cap 25 and/or in/on the cup-like plug portion 26. The coding 211 may or may not be used in all embodiments of the invention.

The antenna sealing plug 2 may be configured as a molded part, for example in an injection molding procedure. That is to say, the antenna sealing plug 2 may be produced before being mounted on a feedthrough portion of an antenna interconnect device 1 (prefabrication) and, of course, before being mounted in the feed-through (final assembly) of the vehicle. Therefore, it does not have to be produced during the prefabrication of an antenna device 0 or mounting of the antenna device 0. Therefore, in a normal procedure, if something goes wrong following the injection molding process, the interconnect device 1 as a whole is not defective; that is to say, the handling is improved.

On the one hand, it is possible to assemble the antenna device 0 just before it is mounted in the intended component. On the other hand, it is possible to deliver the antenna device 0, fully pre-mounted, to the customer, to the assembly line or for mounting, so that it only needs to be installed. In the case of a repair, in the worst case scenario, it is only necessary to replace the sealing plug 2, and not the entire antenna interconnect device 1. Recycling (disconnecting or dismantling the antenna device 0 again for reuse or further use) is furthermore facilitated. All in all, costs are significantly reduced because processes are omitted and the sealing with hot melt adhesive is omitted.

The antenna sealing plug 2 may be adapted to the requirements of the intended component. An interconnect device 1 and/or signal carrier (ribbon conductor, printed cable, sensor line) may be arranged within the feedthrough portion, wherein an HBL with a flat ribbon cable is one possible application. The antenna sealing plug 2 may be provided, pre-fastened, on the antenna interconnect device 1 for rapid and easier mounting, wherein, apart from mounting the antenna sealing plug, additional sealing work is not required.

A strain-relief device, positioning aid and/or fastening means may be integrated in the antenna interconnect device 1 or a foil of the antenna interconnect device 1; this facilitates the mounting of the antenna interconnect device 1 in the antenna sealing plug 2 and/or ensures the position of the antenna interconnect device 1 on/in the antenna sealing plug 2. The strain-relief device, positioning aid and/or fastening device may be provided or arranged in the feedthrough portion 110 and/or in/on the feedthrough portion 110 so as to be adjacent, in particular immediately adjacent, to the antenna sealing plug 2. This may be realized, for example, by at least one projection at the top of the antenna interconnect device 1 in the axial direction and at the bottom of the antenna interconnect device 1 in the axial direction in each case. The projections receive the antenna sealing plug 2 between them, for example.

What is claimed is:

1. An antenna sealing plug for a flexible antenna interconnect device, comprising:
    a sealing surface extending around the antenna sealing plug in a circumferential direction and sealing a feedthrough of a vehicle that leads into the vehicle, a feedthrough portion of the flexible antenna interconnect device can be guided through the feed-through of the vehicle; and
    a slot-like passage through which the feedthrough portion of the flexible antenna interconnect device can be guided through the antenna sealing plug in a sealing manner.

2. The antenna sealing plug of claim 1, wherein the slot-like passage leads in in at a first outer region of the antenna sealing plug and leads out at a second outer region of the antenna sealing plug.

3. The antenna sealing plug of claim 1, wherein the slot-like passage is, at least in a mounting position of the antenna sealing plug, substantially completely surrounded by a material of the antenna sealing plug in the circumferential direction at a point along a path through the antenna sealing plug.

4. The antenna sealing plug of claim 1, wherein the slot-like passage:
    is curved, linear, and/or undulating;
    opens in a radial direction of the antenna sealing plug in a pre-mounting position;
    has a longitudinal portion that is completely closed in the circumferential direction or open on at most two sides; and/or
    has a passage portion in an axial portion in an installation direction of the feedthrough portion.

5. The antenna sealing plug of claim 1, wherein the slot-like passage extends completely through the antenna sealing plug and/or has a center line extending completely through the antenna sealing plug in a radial direction and/or in an axial direction of the antenna sealing plug.

6. The antenna sealing plug of claim 1, wherein the slot-like passage extends part way into the antenna sealing plug and/or has a center line extending part way into the antenna sealing plug in a radial direction.

7. The antenna sealing plug of claim 1, wherein a surface spanned by the slot-like passage extends within the antenna sealing plug in a radial direction and an axial direction of the antenna sealing plug, is a curved surface within the antenna sealing plug with a linear section as a generatrix, and extends within the antenna sealing plug at least partially in the circumferential direction.

8. The antenna sealing plug of claim 1, wherein a curved surface spanned by the slot-like passage:
    begins or ends on a radial outer side of the antenna sealing plug;
    progresses substantially in a radial direction in a radial outer region in the antenna sealing plug;
    bends increasingly within the antenna sealing plug in an axial direction of the antenna sealing plug;
    progresses substantially in the axial direction in an axial outer region in the antenna sealing plug; and/or
    ends or begins on an axial outer side of the antenna sealing plug.

9. The antenna sealing plug of claim 1, wherein a surface spanned by the slot-like passage extends into the antenna sealing plug from an axial outer position on the antenna sealing plug and:
    extends in an axial direction of the antenna sealing plug as a substantially planar or undulating surface;
    a linear section as a generatrix of the surface extends into the antenna sealing plug substantially only in a radial direction of the antenna sealing plug; and/or
    reaches a center axis of the antenna sealing plug or intersects the center axis.

10. The antenna sealing plug of claim 1, wherein the antenna sealing plug is composed of a pair of mutually connectable or connected portions.

11. The antenna sealing plug of claim 10, wherein the pair of mutually connectable or connected portions:
    are separated from one another or can be separated from one another by a plane which extends substantially exclusively in a radial direction of the antenna sealing plug;
    are separated from one another by a curved half plane starting inside the antenna sealing plug and extending in the radial direction and/or in an axial direction of the antenna sealing plug; and/or
    complement one another, at least in part, and are joined together in a form-fitting manner, at least in part.

12. The antenna sealing plug of claim 1, wherein the antenna sealing plug is substantially composed of a plug head and a plug body adjoining the plug head.

13. The antenna sealing plug of claim 12, wherein:
    the plug body has the sealing surface;
    the plug head or a transition portion from the plug body into the plug head has an end portion of the slot-like passage for the feedthrough portion; and/or
    the slot-like passage extends into the plug body, starting from the plug head, and through the plug body and the plug head.

14. The antenna sealing plug of claim 1, wherein the antenna sealing plug has a pair of mutually connectable parts including a plug cap and a cup-like plug portion.

15. The antenna sealing plug of claim 14, wherein:
    a dividing plane of the antenna sealing plug is located in the plug cap and the dividing plane divides the antenna sealing plug into the plug cap and the cup-like plug portion;
    the plug cap and the cup-like plug portion are two mutually separate parts and produced separately from one another;

the plug cap and the cup-like plug portion are a single part produced together; and/or the plug cap and the cup-like plug portion are connected to one another via a hinge.

16. The antenna sealing plug of claim 1, wherein the antenna sealing plug has a receptacle for a connector, the receptacle complements the connector, at least in part, and the connector can be inserted into the receptacle in a form-fitting manner.

17. The antenna sealing plug of claim 1, wherein the antenna sealing plug:
is a molded part;
has an integral or multi-part configuration;
does not comprise a hot melt adhesive;
is produced from an elastic material; and/or
has a securing element by which a mechanical contact pressure can be applied to the feedthrough portion.

18. An antenna device, comprising:
an antenna interconnect device; and
an antenna sealing plug having a sealing surface extending around the antenna sealing plug in a circumferential direction and sealing a feed-through of a vehicle that leads into the vehicle, a feedthrough portion of the antenna interconnect device is guided through the feedthrough of the vehicle, and a slot-like passage through which the feedthrough portion of the antenna interconnect device is guided through the antenna sealing plug in a sealing manner.

19. The antenna device of claim 18, wherein:
the antenna sealing plug is pre-mounted on the feedthrough portion of the antenna interconnect device;
the antenna interconnect device extends completely through the antenna sealing plug; and/or
the feedthrough portion is arranged in the antenna sealing plug in a liquid-tight manner.

20. A vehicle add-on part, comprising the antenna sealing plug of claim 1.

* * * * *